United States Patent
Kettle et al.

(10) Patent No.: US 7,551,154 B2
(45) Date of Patent: Jun. 23, 2009

(54) IMAGE DISPLAY SYSTEM AND METHOD

(75) Inventors: Wiatt E. Kettle, Corvallis, OR (US);
Matthew J. Gelhaus, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 11/227,370

(22) Filed: Sep. 15, 2005

(65) Prior Publication Data
US 2007/0058087 A1    Mar. 15, 2007

(51) Int. Cl.
*G09G 3/34* (2006.01)
(52) U.S. Cl. .......................... 345/84; 348/742
(58) Field of Classification Search ............ 345/84, 345/85; 348/742
See application file for complete search history.

(56) References Cited

U.S. PATENT DOCUMENTS

| | | | |
|---|---|---|---|
| 5,122,791 A | 6/1992 | Gibbons et al. | |
| 5,303,055 A | 4/1994 | Hendrix et al. | |
| 5,428,408 A | 6/1995 | Stanton | |
| 5,497,172 A * | 3/1996 | Doherty et al. | 345/85 |
| 5,508,750 A | 4/1996 | Hewlett et al. | |
| 5,668,611 A * | 9/1997 | Ernstoff et al. | 348/771 |
| 5,757,348 A | 5/1998 | Handschy et al. | |
| 5,767,828 A | 6/1998 | McKnight | |
| 5,852,473 A | 12/1998 | Horne et al. | |
| 5,903,323 A | 5/1999 | Ernstoff et al. | |
| 5,982,553 A | 11/1999 | Bloom et al. | |
| 5,990,982 A | 11/1999 | Gove et al. | |
| 6,058,140 A | 5/2000 | Smolenski | |
| 6,064,796 A | 5/2000 | Nakamura et al. | |
| 6,069,664 A | 5/2000 | Zhu et al. | |
| 6,108,041 A | 8/2000 | Faroudja et al. | |
| 6,232,963 B1 | 5/2001 | Tew et al. | |
| 6,246,185 B1 | 6/2001 | Parks | |
| 6,288,695 B1 | 9/2001 | Wood | |
| 6,452,583 B1 | 9/2002 | Takeuchi et al. | |
| 6,456,301 B1 | 9/2002 | Huang | |
| 6,472,946 B2 | 10/2002 | Takagi | |
| 6,520,648 B2 | 2/2003 | Stark et al. | |
| 6,525,774 B1 | 2/2003 | Sugihara | |
| 6,529,204 B1 | 3/2003 | Mikoshiba et al. | |
| 6,549,240 B1 | 4/2003 | Reitmeier | |
| 6,592,227 B2 | 7/2003 | Ouchi et al. | |

(Continued)

FOREIGN PATENT DOCUMENTS

EP    1 176 578 A2    1/2002

(Continued)

*Primary Examiner*—Alexander Eisen
*Assistant Examiner*—Kenneth B Lee, Jr.

(57) ABSTRACT

Disclosed are embodiments of a system and method for processing an image. An image processing unit includes a processor unit and a control unit. The processor unit receives an incoming video signal. The control unit defines image frames from the video signal. The image frames have bit planes in a plurality of spatial segments for manifestation on a spatial light modulator. The control unit also defines on and off states for a solid state light source. The control unit modulates the solid state light source at a modulated level during at least one bit plane such that illumination of the solid state light source at the modulated level is equally applied during the at least one bit plane for each of the plurality of spatial segments.

30 Claims, 4 Drawing Sheets

U.S. PATENT DOCUMENTS

| | | |
|---|---|---|
| 6,621,529 B2 | 9/2003 | Ohara et al. |
| 6,683,657 B1 | 1/2004 | Miyawaki |
| 6,700,622 B2 | 3/2004 | Adams et al. |
| 6,758,579 B2 | 7/2004 | Ishikawa et al. |
| 6,828,961 B2 | 12/2004 | Elliott et al. |
| 6,839,094 B2 | 1/2005 | Tang et al. |
| 6,846,080 B2 | 1/2005 | Inoue et al. |
| 6,861,656 B2 | 3/2005 | Murakami |
| 6,890,078 B2 | 5/2005 | Koide |
| 2001/0022613 A1 | 9/2001 | Matsui et al. |
| 2002/0005913 A1 | 1/2002 | Morgan et al. |
| 2002/0021261 A1 | 2/2002 | Werner |
| 2002/0021292 A1 | 2/2002 | Sakashita |
| 2002/0085438 A1 | 7/2002 | Wolverton |
| 2002/0105621 A1 | 8/2002 | Kurematsu |
| 2003/0031461 A1 | 2/2003 | Takayama |
| 2003/0169281 A1 | 9/2003 | Nishi et al. |
| 2003/0231194 A1 | 12/2003 | Morgan et al. |
| 2004/0001184 A1 | 1/2004 | Gibbons et al. |
| 2004/0004675 A1 | 1/2004 | Honda |
| 2004/0008288 A1 | 1/2004 | Pate et al. |
| 2005/0007390 A1 | 1/2005 | Yoshida et al. |
| 2005/0017990 A1 | 1/2005 | Yoshida |
| 2005/0052376 A1 * | 3/2005 | Shivji .......................... 345/82 |
| 2005/0068503 A1 | 3/2005 | Imade |
| 2005/0078056 A1 | 4/2005 | Childers |

FOREIGN PATENT DOCUMENTS

| | | |
|---|---|---|
| WO | WO 94/10675 A | 5/1994 |

* cited by examiner

IMAGE DISPLAY SYSTEM AND METHOD

BACKGROUND

Various techniques for displaying images exist. One such approach is accomplished with the use of digital image projectors or digital light processing-based projectors that utilize data and signal driven digital mirror devices (DMDs). Typically, it is preferable to enable the generation of a large number of primary colors on such projectors, sometimes referred to as "bit depth". In such cases, there is typically a trade-off between color gamut and brightness when increasing the rate at which illumination changes these primary colors. In systems using arc lamp illumination and color wheel filters, a compromise is reached between maximizing the number of segments to minimize the "rainbow" artifact associated with single panel spatial light modulator (SLM) systems and the color gamut/brightness decrease associated with using more segments

SUMMARY

Exemplary embodiments of the present invention include a system and method for processing an image. An image processing unit includes a processor unit and a control unit. The processor unit receives an incoming video signal. The control unit defines image frames from the video signal. The image frames have bit planes in a plurality of spatial segments for manifestation on a spatial light modulator. The control unit also defines on and off states for a solid state light source. The control unit modulates the solid state light source at a modulated level during at least one bit plane such that illumination of the solid state light source at the modulated level is equally applied during the at least one bit plane for each of the plurality of spatial segments.

DETAILED DESCRIPTION

In the following Detailed Description, reference is made to the accompanying drawings, which form a part hereof, and in which is shown by way of illustration specific embodiments in which the invention can be practiced. It is to be understood that other embodiments can be utilized and structural or logical changes can be made without departing from the scope of the present invention. The following Detailed Description, therefore, is not to be taken in a limiting sense, and the scope of the present invention is defined by the appended claims.

Figure 1:
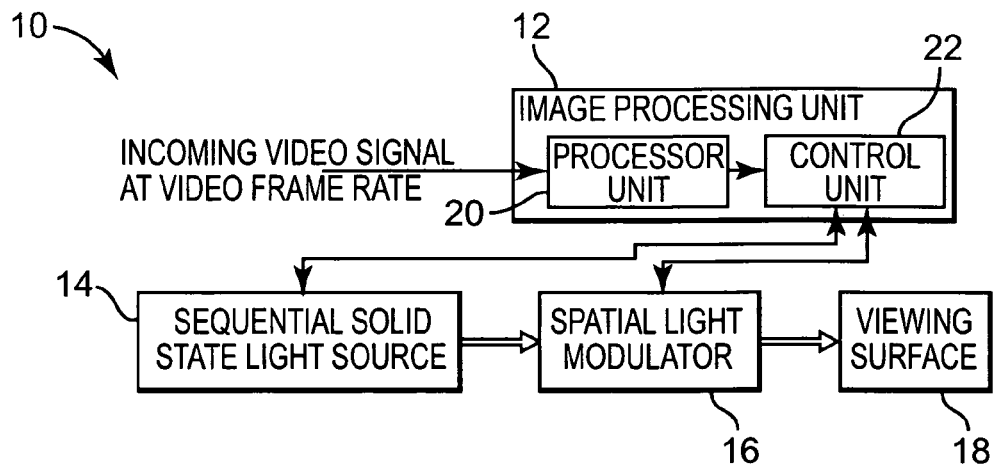
FIG. 1 illustrates a schematic diagram of a system for displaying images according to an embodiment of the present invention.

FIG. 1 illustrates image display system 10 in accordance with one embodiment of the present invention. In one example, image display system 10, includes image processing unit 12, sequential solid state light source 14, spatial light modulator 16 and viewing surface 18. In one example, image display system 10 is a digital projector that is used to project an image. Image processing unit 12 receives an incoming video signal. Image processing unit 12 processes the video signal and then controls the sequential solid state light source 14 and spatial light modulator 16 in order to project the incoming video signal as an image on viewing surface 18.

In one embodiment, image processing unit 12 includes processor unit 20 and control unit 22. Processor unit 20 is configured to receive the incoming video signal and to process the incoming video signal, and control unit 22 is then configured to receive the processed information and to generate control signals used to control solid state light source 14 and spatial light modulator 16.

In one embodiment, the image processing unit 12 is configured to receive an incoming video signal and to convert that signal into a sequence of image frames. Each image frame defines primary color values for each pixel to be defined upon viewing surface 18. In one example, the color values would represent the intensity of red, green, and blue components of light to be displayed for each pixel displayed on viewing surface 18.

The image processing unit 12 is further configured to convert each image frame into a plurality of bit planes. Each of the plurality of bit planes defines an associated primary color and bit plane time period having a bit plane time duration. Within a bit plane time period, each pixel element of modulator 16 is either in an on or off state. Each bit plane time period further defines one or more display slices, where each display slice has a duration of one or more time slices, and where a time slice is the base unit for counting duration. When a bit plane time period is divided into more than one display slice the display slices are temporally separated within a frame period. To define the primary color associated with the bit plane, the image processing unit 12 is configured to operate the solid state light source 14 to illuminate the spatial light modulator 16 with light having a spectral distribution that defines the primary color during the bit plane time period.

During the bit plane time period, an array of pixels corresponding to the array of pixel elements is cast upon viewing surface 18. For the array of pixels, there is a pixel having the primary color corresponding to each pixel element that is in the on state. There is a missing or black pixel for each pixel element that is in the off state.

In one embodiment, control unit 22 sends control signals to the solid state light source defining a sequence of states for the solid state light source. Each of the sequence of states defines an average intensity and a primary color of light that the solid state light source 14 provides to the array of pixel elements on spatial light modulator 16 during each bit plane time period.

In one embodiment, each of the sequence of states for the solid state light source 14 corresponds to one of the sequence of display slices that are each manifested on spatial light modulator 16, one display slice after another. During the sequence of display slices, the average intensity (averaged over the display slice time period) changes from one display slice to the next for one or more sequential pairs of display slices. During the sequence of display slices, a selection of a primary color of light that the solid state light source 14 provides changes from one display slice to the next for one or more sequential pairs of display slices.

In one embodiment, the control unit 22 sends control signals to the solid state light source 14 that defines a sequence of light pulses emitted by the solid state light source 14. A light pulse is defined as the light source 14 turning on for a brief duration and then off. A light pulse is characterized by an average intensity level, a primary color emitted, and a duration.

In one embodiment, sequential solid state light source 14 is a plurality of solid state light emitting diodes (LEDs). For example, in one case, sequential solid state light source 14 includes red LED(s), green LED(s), and blue LED(s). It can be appreciated that alternative and/or additional solid state light sources can be used generating colors such as white, cyan, yellow, magenta, among others. The solid state light source is optically configured to illuminate a pixel array formed in a surface of spatial light modulator 16.

LED illumination, when used in conjunction with a SLM capable of global pixel state changes, can avoid color gamut losses while maintaining maximum lumen output from the light source. The same red/green/blue primaries which are filtered from white light by a typical color wheel can instead be chosen as the three colors of independent LEDs. The LEDs may be switched on and off with crisp transitions unlike the spokes of a color wheel.

In one embodiment, spatial light modulator 16 is a digital micro-mirror device (DMD). A DMD has an array of micro-mechanical display elements, each having a tiny mirror that is individually addressable with an electronic signal. Depending on the state of its addressing signal, each mirror tilts so that it either does or does not couple light to an image plane of viewing surface 18. Each of the mirrors is referred to as a "pixel element," and the image each pixel element generates upon the viewing surface 18 can be referred to as a "pixel." Generally, displaying pixel data is accomplished in part by loading memory cells connected to the pixel elements. Each memory cell receives one bit of data representing an on or off state of a pixel element. The image processing unit 12 is configured to maintain the pixel elements in their on or off states for a controlled duration.

Such DMD-type SLMs have the capability to switch all the mirrors or pixel elements from one data state to another on a global basis. For systems with a single global mirror event (that is, the simultaneous turning off and turning on of associated primary colored LEDs), there is no "spoke time" as there is with color wheels. The result is the ability to minimize the rainbow effect by creating virtual color wheels with a very rapid effective segment-to-segment change rate and not sacrifice time which can only be used as white boost time.

The present invention can be applicable to other spatial light modulators 16 that are rapidly switchable between on and off states to define images on a viewing surface. Examples of other spatial light modulator technologies include LCOS (liquid crystal on silicon) and linear arrays of deflectable beams. With such embodiments, each of the individual modulators is also referred to as a "pixel element," and the image each pixel element generates upon the viewing surface 18 can be referred to as a "pixel." Generally, when pixel data is loaded into these types of devices, however, each pixel element changes as that data is loaded. In this way, there is no double data buffering such that pixel elements do not change from one data state to another on a global basis. In some such systems, pixel changes occur at the same rate data is loaded into the chip.

In one embodiment, each light pulse has a time duration that falls within one of the display slices. Stated another way, the solid state light source 14 turns on at the beginning or within the display slice time period and turns off at the end or within the display slice period so that the duration during which the solid state light source is on (the light pulse duration) falls within the display slice time period. For some display slices, there can be more than one light pulse emitted during each display slice time period.

To quantify the generation of bit planes, consider an example wherein the image frames are generated at 60 frames per second such that each frame lasts for approximately 16.67 milliseconds. To generate 24 bit color or 8 bits per primary color, a minimum of 8 bit planes need to be defined per primary color. The bit planes typically have time durations that vary in a binary manner, from the least significant bit ("LSB") to the most significant bit (MSB).

Based upon this, it would be expected that the LSB for a given primary color would have a time duration of about one third of about $1/256^{th}$ of a frame period, or about 22 microseconds. This can result in an operational bottleneck due to the immense data rate and mirror frequency requirements for the system to position the mirrors for a bit plane. In one embodiment, this can be mitigated by modulating the light source within bit planes to extend the minimum duration requirement for bit planes.

Having a time-contiguous MSB can result in visual artifacts frame to frame. Therefore, dividing up the MSB over the frame period can be optimal. Stated another way, the most significant bit time period is divided up into non-contiguous or temporally separated display slices. For each most significant bit plane, the display slices are distributed or temporally spaced apart during the frame period.

An exemplary set of bit planes for a single primary color that takes the aforementioned factors into account is depicted in the following table:

| Bit Plane | Weighting | Duration/Display slice | No. of Slices | Avg. Intensity |
|---|---|---|---|---|
| 0 | 1 | 1 | 1 | 1 |
| 1 | 2 | 1 | 1 | 2 |
| 2 | 4 | 1 | 1 | 4 |
| 3 | 8 | 1 | 1 | 8 |
| 4 | 16 | 2 | 1 | 8 |
| 5 | 32 | 2 | 2 | 8 |
| 6 | 64 | 2 | 4 | 8 |
| 7 | 128 | 2 | 8 | 8 |

In this example, the entire frame period is divided up onto 19 display slices for each of red, green, and blue, or a total of 57 display slices. The least significant bit plane is generated in one display slice that is about 163 microseconds long. This is made possible by the variation in the average intensity adjustments for bit planes 0 to 3. In the example depicted in the table above, the most significant bit plane (bit 7) time period is divided up into 8 separate display slices that can be temporally separated over the frame period.

The following defines terms used in the table.

Weighting: The weighting depicted above is binary, but this need not be the case. The weighting factor is proportional to the per pixel contribution to the average intensity during a frame period when that pixel is turned ON.

Duration/Display slice: The time duration of each display slice. For the case where each of three primary colors are handled equally and for a 60 hertz frame rate, the shortest duration display slice (for bit planes 0-3) would have a duration of about 163 microseconds.

No. of Slices: How many display slices are required to provide that significance of bit. Stated another way, this is the number of temporally spaced display slices utilized to provide the bit plane time period.

Avg. Intensity: Average intensity of light received by the DMD from the solid state light source during each display slice for that bit. This intensity level can be achieved by varying the actual intensity of the light source or by varying the duty cycle (percentage of the duration of the bit plane for which the light source is ON) during the bit plane time period. Although varying either the intensity level or modulating the duty cycle can be used, following illustrations will vary only the intensity level for simplicity of illustration.

To avoid various visual artifacts, it is best to temporally separate the most significant bits for each primary color. Keeping this in mind, the following is an exemplary temporal sequence of display slices during a frame period based on the earlier table: 7R,7G,7B,6R,6G,6B,7R,7G,7B,4R,4G,4B,7R, 7G,7B,3R,3G,3B,2R,2G,2B,1R,1G,1B,0R,0G,0B,6R,6G, 6B,7R,7G,7B,5R,5G,5B,7R,7G,7B,6R,6G,6B,7R,7G,7B, 5R,5G,5B,7R,7G,7B,6R,6G,6B 7R,7G,7B In this example, 6R is indicative of one display slice of bit 6 for red, 3B means bit 3 for blue, etc. As discussed earlier, bits 7, 6, and 5 for each primary color are divided up into 8, 4, and 2 temporally separated display slices respectively. In this way, the image processing unit 12 generates first control signals to define the bit planes such as those discussed above that are manifested upon spatial light modulator 16.

Figure 2:
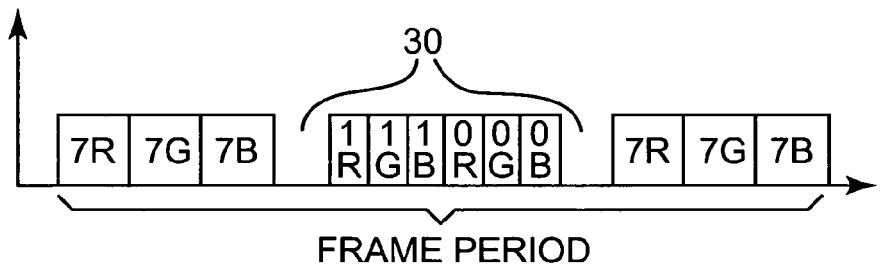
FIG. 2 is a timing diagram illustrating a portion of a frame period including a sequence of bit planes according to an embodiment of the present invention.

A timing diagram illustrating part of the display slices from this sequence is depicted in FIG. 2. The timing diagram of FIG. 2 only depicts 12 of the 57 display slices in the sequence above with display slices in gaps 30 left out of the timing diagram for simplicity.

Figure 3:
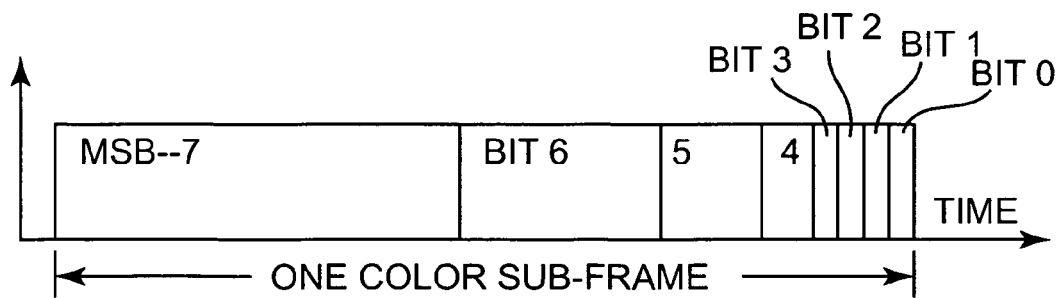
FIG. 3 illustrates an exemplary time period for an image display system in accordance with various embodiments of the present invention.

FIG. 3 illustrates a simplified timing diagram for a single color sub-frame for a 24 bit color system. The depicted color sub-frame is intended to illustrate a simplified embodiment of some aspects of the present invention. During the illustrated sub-frame, bit planes including MSB plane 7, bit plane 6, bit plane 5, bit plane 4, bit plane 3, bit plane 2, bit plane 1 and LSB plane 0 are illustrated. These bit planes are to be manifested upon spatial light modulator 16 and the control signals define which pixel elements are in an ON or OFF state during portions of each bit plane duration. In the illustrated example, each bit plane contributes one half of the apparent intensity of the next higher numbered bit plane. For example, bit plane 5 contributes one half of the apparent intensity of bit plane 6.

In the illustration, however, bit planes 0-3 are each of the same time duration. Consequently, in accordance with one embodiment of the invention, in order to ensure that each bit plane contributes one half of the apparent intensity of the next higher numbered bit plane for these four bit planes, solid state light source 14 is modulated during bit planes 0-3.

Figure 4A:
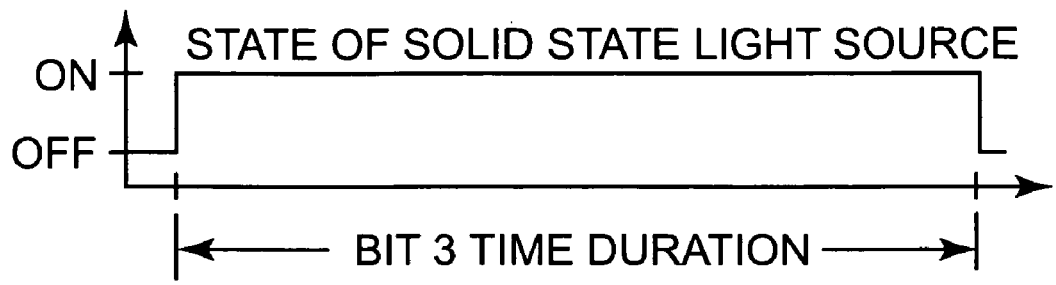
FIGS. 4A-4D are exemplary time periods illustrating bit plane duration for a series of bit planes in accordance with an embodiment of the present invention.
Figure 4B:
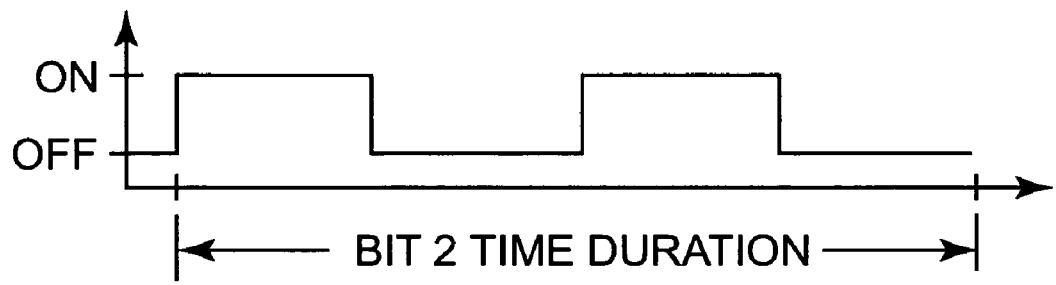
Figure 4C:
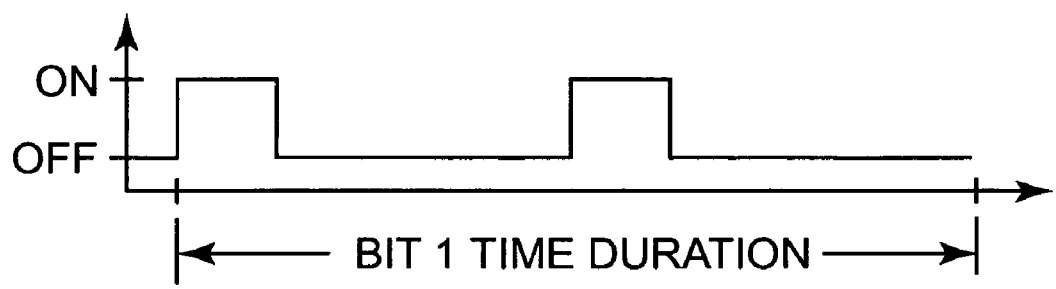
Figure 4D:
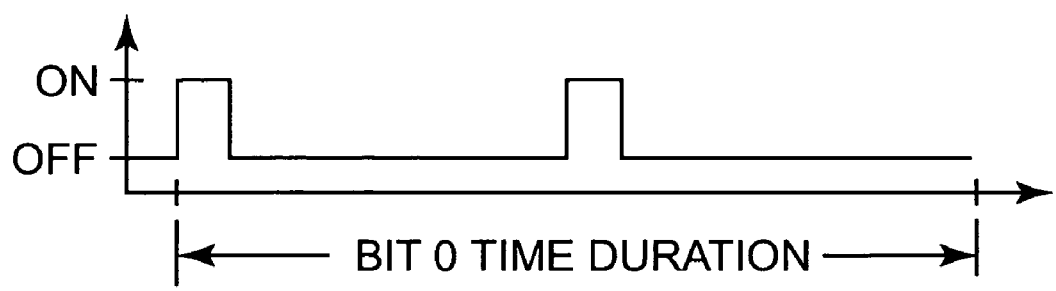

The state of the solid state light source 14 versus time during each of the last 4 significant bits is illustrated in the timing diagrams of FIGS. 4A-4D. FIG. 4A illustrates the fourth least significant bit plane (bit plane 3), where the solid state light source 14 is on for the entire bit plane duration. FIG. 4B illustrates the third least significant bit plane (bit plane 2), where the solid state light source 14 is on for one half of the bit plane duration. FIG. 4C illustrates the second least significant bit plane (bit plane 1), where the solid state light source 14 is on for one quarter of the bit plane duration. FIG. 4D illustrates the LSB plane (bit plane 0), where the solid state light source 14 is on for one eighth of the bit plane duration.

This "sub-modulation" of solid state light source 14 during these least significant bit planes 0-3 ensures that each bit plane still effectively contributes one half of the apparent intensity of the next higher numbered bit plane, while at the same time allowing certain bit planes (bit planes 0-3 in the illustration) to be of the same time duration at spatial light modulator 16.

In this way, limitations in switching speeds of spatial light modulator 16 or the data bandwidth of the image processing unit 12 can be overcome. Conventional micro-mirror based projector systems, such as the digital light processing-based systems, generate defined bit planes during which each pixel element of a light modulator is either on or off. The bit depth of such systems is partly dependent upon how fast the pixel elements can switch. When using a three color wheel at a 60 Hz (or sometimes faster) frame or sub-frame rate, the required mirror frequency is about 46 KHz or higher to achieve 24 bit color. This is difficult to accomplish due to limitations in switching speeds. Consequently, some systems obtain this color depth by the use of spatial dithering (with a checkerboard pattern) that may be temporally varied frame to frame. This can result in certain visual artifacts and/or resolution loss.

Although modulation of the LED within least significant bit planes is effective in digital light processing-based systems, performing such modulation can be challenging in non-globally changing SLM systems, such as those described above. In non-globally changing SLM systems, each of the pixels in the arrays of the spatial light modulators 16 change as the data is loaded. The data can be described as loading onto the spatial light modulator 16 in arrays or segments.

Figure 5:
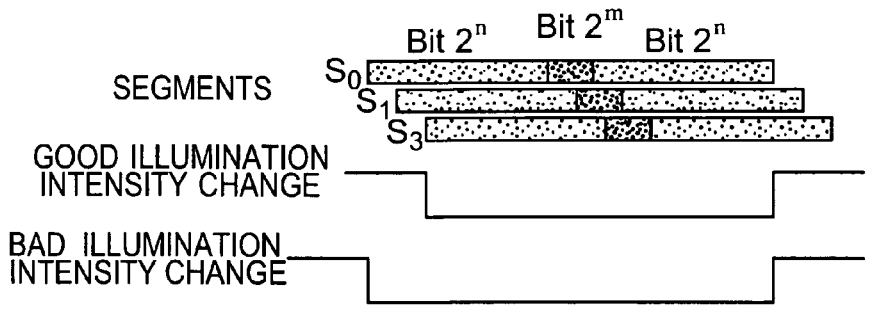
FIG. 5 illustrates changes in illumination intensities versus relative bit display times for spatial light modulators in accordance with an embodiment of the present invention.

FIG. 5 illustrates data loading onto spatial light modulator 16 in three spatially separated segments $S_0$, $S_1$, and $S_3$. Illumination intensity is illustrated relative to (below) bit display times for spatial light modulator 16, which in this case is without global pixel change control. Time is represented horizontally in the figure, and the three segments in the vertical direction spatially represent the data that has loaded onto spatial light modulator 16. As is evident from FIG. 5, the three data segments are temporally shifted relative to each other. One embodiment of the present invention accounts for this temporal shift when modulating the intensity of the LEDs for the least significant bit planes.

In FIG. 5, n and m bit planes of various display times $2^n$ and $2^m$, respectively, are illustrated. In the illustration, "m" indicates those bits whose binary display time is lower than the time it takes to load a pixel array once. Bit plane "n" is illustrated as split into two display slices, which together are the total display time for that particular bit. "Good illumination intensity change" illustrates the time period for which intensity changes may by made so that all points average out the intensity produced on the different segments $S_0$, $S_1$, and $S_3$. An intensity change marked by the "Bad Illumination intensity change" would result in the bottom two segments being incrementally brighter than the top segment when integrated over time, because of the relative temporal shift of segments $S_0$, $S_1$, and $S_3$ While the method shown in FIG. 5 does introduce a slight color error, it is consistent spatially across the array. Such an error can be minimized by proper color mapping upstream in the processing unit 20, or by slightly adjusting the duration of the bit display times within which there is an intensity change.

Figure 6:
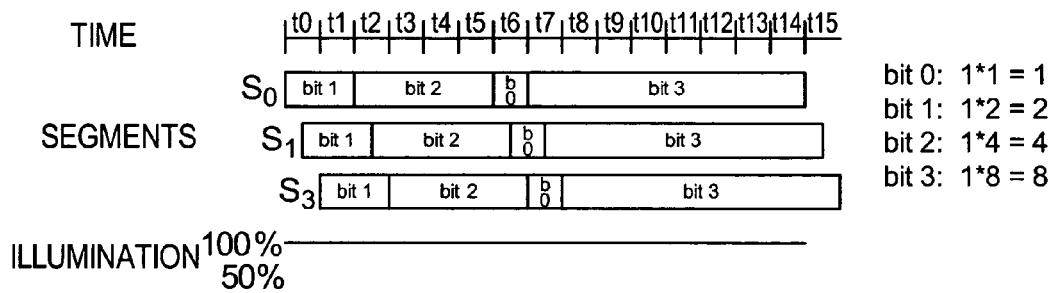
FIG. 6 illustrates constant illumination intensity versus relative bit display times for spatial light modulators according to an embodiment of the present invention.

The previously-mentioned color error can be eliminated completely by appropriately modifying the time duration for the longer bit segments that border the smaller bit segment with half illumination. For example, consider an example using 4 bits of color and 3 segments on the spatial light modulator 16. FIG. 6 illustrates a bit plane approach to modulating color using constant 100% illumination ("1"). In this way, the duration of the bit planes is adjusted to achieve the appropriated weighting, that is, the duration of bit 1 ("2") is twice as long as bit 0 ("1"), the duration of bit 2 ("4") is twice as long as bit 1("2"), and so on. Here, the bit planes having shorting duration are surrounded by bit planes having longer durations.

Figure 7:
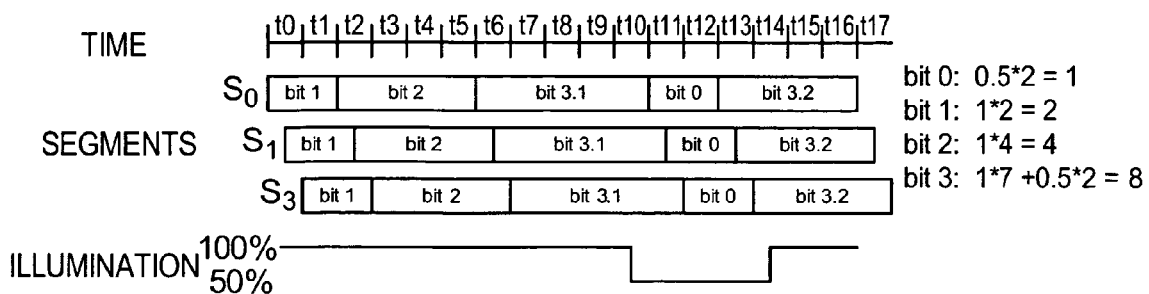
FIG. 7 illustrates changes in illumination intensities versus relative bit display times for spatial light modulators in accordance with another embodiment of the present invention.

FIG. 7 illustrates how these same bit weightings that are illustrated in FIG. 6 can be achieved without introducing any color error by splitting the most significant bit into two display slices and putting each half of the split bit before and after the least significant bit which is displayed with 50% illumination. The split durations have been adjusted slightly longer to compensate for the time they are displayed with 50% illumination. By increasing the total time allocated to the most significant bit and the least significant bit, the resulting bit weightings are exactly the same, and therefore, there is no color error. For the least significant bit (bit 0 in the illustration), the 50% illumination begins before the front edge of that portion of bit 0 in segment $S_0$, and ends after the trailing edge of that portion of bit 0 in segment $S_3$. In this way, the 50% illumination is equally applied during all portions of bit 0 in all segments. Applying the 50% illumination equally for bit planes in all segments ensures that the bit planes have the same level of brightness in each of the segments when integrated over time.

Figure 8:
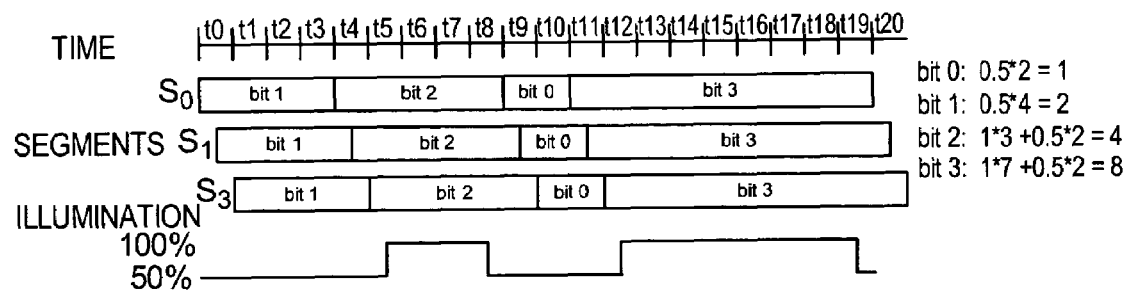
FIG. 8 illustrates changes in illumination intensities versus relative bit display times for spatial light modulators in accordance with another embodiment of the present invention.

FIG. 8 illustrates how this same technique can be used without using multiple display slices by alternating between bits displayed with 50% illumination and bits displayed with 100% illumination. Bits 0 and 1 are displayed with 50% illumination, and bits 2 and 3 are displayed mostly with 100% illumination, except for the head and tail of each bit duration of the bit display, which is displayed at 50% illumination. The bit durations for bits 2 and 3 are adjusted slightly longer to compensate for the time they are displayed at the lower illumination level. The resulting bit weightings are the same as the original case, and therefore there is no color error.

Figure 9:
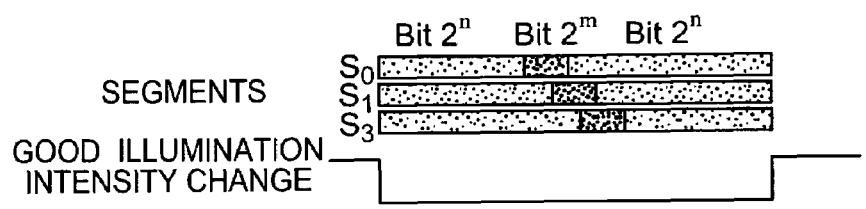
FIG. 9 illustrates changes in illumination intensities versus relative bit display times for spatial light modulators in accordance with another embodiment of the present invention.

A similar approach can be applied to SLMs which have global pixel change control (for example, DMD). This variation has the advantage that the all the pixels in the SLM array can change corresponding an intensity change. Scheduling of the events can be simplified and very little (theoretically zero) intensity error will be introduced to the bit intensities adjacent to the illumination intensity change. FIG. 9 represents the described case. This approach still allows the ability to make adjust some or all of the bit display times.

Non-globally changing single panel SLM systems also present challenges at the "spokes," or transitions between LED colors. In non-globally changing SLM systems, each of the pixels in the arrays of the spatial light modulators 16 change as the data is loaded such that some data being loaded/displayed on the spatial light modulator 16 can associated with a first LED color, while some of the data being loaded is associated with a second LED color.

For these non-globally changing single panel SLM systems, some measures can be employed to minimize the color errors that can otherwise occur at the "virtual spoke," that is, the transition from one colored LED to another. With a first approach, at the beginning of a virtual spoke, the next color LED can be turned on and the current color LED would remain on. In this way, the SLM would continue to modulate the correct primary colors (albeit less saturated) during the "virtual spoke" or illumination transition where more than one primary illuminates the spatial light modulator 16. After all the pixels have reached the new color state, the previous LED color would be turned off to maximize color saturation for the remainder of color segment. There is no limitation on how many times the LEDs can cycle through colors during a frame except that data displayed on the pixel array must always match at least one of the illumination colors. This method balances sacrifices in both brightness and color gamut.

A second approach operates similar to this described first approach, except that at the beginning of a virtual spoke, all color LEDs turn on to provide true white illumination on the spatial light modulator 16. At the end of the spoke, only the LED for the new primary color is left on. This second approach has more brightness than the first, but sacrifices some amount of color gamut versus the other approach.

A third approach turns off all the LEDs at the beginning of a virtual spoke, and the new primary color LED turns on only after all array pixels have been updated to their new states. This approach sacrifices some brightness, but maintains a wider color gamut.

With a fourth approach, the display is first updated to display "white" data (data common to all primaries and subtracted from each portion of the primary-only data), then the next color LED turns on to begin a virtual spoke, then the previous color LED turns off, and then the display is updated to show the new primary color data. This approach has slightly better color accuracy than the first approach, but is otherwise similar in performance.

A fifth approach operates similar to this described fourth approach, except after the display is updated to display "white" data, all color LEDs turn on to provide true white illumination to the spatial light modulator 16. At the end of the spoke, only the LED for the primary color is left on, and the display is updated to show only the new primary color data. This approach has slightly better color accuracy than does the second approach, but is otherwise similar in performance.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An image processing unit comprising:
  a processor unit configured to receive an incoming video signal; and
  a control unit configured to define image frames from the video signal, the image frames having bit planes in a plurality of spatial segments for manifestation on a spatial light modulator, the control unit further configured to define on and off states for a solid state light source; wherein the control unit modulates the solid state light source at a modulated level during at least one bit plane such that illumination of the solid state light source at the modulated level is equally applied during the at least one bit plane for each of the plurality of spatial segments.

2. The image processing unit of claim 1, wherein the modulated level is a decreased illumination intensity of the solid state light source.

3. The image processing unit of claim 2, wherein the modulated level is 50% illumination of the solid state light source relative to the illumination intensity of the solid state light source outside the modulated level.

4. The image processing unit of claim 1, wherein the modulated level is a decreased duty cycle of the solid state light source.

5. The image processing unit of claim 1, wherein the solid state light source is at least one light emitting diode.

6. The image processing unit of claim 1, wherein the spatial light modulator is a non-globally changing system such that each of the bit planes are temporally shifted in each of the plurality of spatial segments, wherein the control unit modulates the solid state light source at the modulated level before the at least one bit plane in a first occurring spatial segment and continues to modulate the solid state light source at the modulated level until after the at least one bit plane in a last occurring spatial segment, and wherein the at least one bit plane during which the solid state light source is modulated at the modulated level comprises the least significant bit plane.

7. The image processing unit of claim 6, wherein the spatial light modulator defines a plurality of pixels that each change as data is loaded to the spatial light modulator; wherein the control unit modulates the solid state light source at the modulated level before the display of a less significant bit plane in a first occurring spatial segment and continues to modulate the solid state light source at the modulated level until after the less significant bit plane in a last occurring spatial segment; a temporal duration of bit planes which are temporally adjacent to the less significant bit plane being adjusted to compensate for the modulation of said solid state light source such that a bit weighting is maintained.

8. The image processing unit of claim 7, wherein a more significant bit plane is split into at least two slices such that a first slice of the split bit plane is on one side of an at least one less significant bit plane during which the solid state light source is modulated at the modulated level and such that a second slice of the split bit plane is on an opposite side of the at least one less significant bit plane during which the solid state light source is modulated at the modulated level, and wherein the solid state light source is modulated at the modulated level during a tail end of the first slice of the split bit plane and during a front end of the second slice of the split bit plane and wherein the overall duration of the split bit plane is increased to maintain an overall bit weighting within a frame.

9. The image processing unit of claim 1, wherein the spatial light modulator is capable of globally changing all of the bit planes simultaneously in each of the plurality of spatial segments, and wherein the control unit modulates the solid state light source at the modulated level in conjunction with setting one bit plane simultaneously across all spatial segments and continues to modulate the solid state light source at the modulated level until after at least one bit plane across all spatial segments.

10. The image processing unit of claim 9, wherein the at least one bit plane during which the solid state light source is modulated at the modulated level is the least significant bit plane.

11. The image processing unit of claim 9, wherein the spatial light modulator defines a plurality of pixels that each change as data is loaded to the spatial light modulator.

12. The image processing unit of claim 9, wherein a bit plane is split into at least two slices such that a first slice of the split bit plane is on one side of the at least one bit plane during which the solid state light source is modulated at the modulated level and such that a second slice of the split bit plane is on an opposite side of the at least one bit plane during which the solid state light source is modulated at the modulated level, and wherein the solid state light source is modulated at the modulated level during a tail end of the first slice of the split bit plane and during a front end of the second slice of the split bit plane and wherein the overall duration of the split bit plane is increased to maintain an overall bit weighting for the split bit plane.

13. An image processing unit comprising:
a processor unit configured to receive an incoming video signal; and
a control unit configured to generate first control signals that define bit planes from the video signal for a spatial light modulator, each of the bit planes being manifested on the spatial light modulator during a bit plane time period in spatial segments, and the control unit further configured to generate second control signals that define states for a solid state light source within each bit plane time period;
wherein the second control signals modulates the solid state light source during at least one of the bit planes of each of the spatial segments to enable a least significant bit plane.

14. The image processing unit of claim 13, wherein at least some of the bit time periods are divided into display slices that are temporally separated during a bit plane time period.

15. The image processing unit of claim 13, wherein modulating the solid state light source during at least one of the bit planes of each of the spatial segments further includes decreasing illumination intensity of the solid state light source during at least one of the bit planes of each of the spatial segments.

16. The image processing unit of claim 13, wherein modulating the solid state light source during at least one of the bit planes of each of the spatial segments further includes decreasing the duty cycle of the solid state light source during at least one of the bit planes of each of the spatial segments.

17. The image processing unit of claim 13, wherein the spatial light modulator is non-globally changing such that each of the bit planes are temporally shifted in each of the spatial segments, and wherein the control unit modulates the solid state light source before the at least one bit plane in a first occurring spatial segment and continues to modulate the solid state light source until after the at least one bit plane in a last occurring spatial segment.

18. The image processing unit of claim 17, wherein the spatial light modulator defines a plurality of pixels that each change as data is loaded to the spatial light modulator.

19. The image processing unit of claim 17, wherein a bit plane is split into at least two slices such that a first slice of the split bit plane is on one side of the at least one bit plane during which the solid state light source is modulated and such that a second slice of the split bit plane is on an opposite side of the at least one bit plane during which the solid state light source is modulated.

20. The image processor of claim 19, wherein the solid state light source is modulated during a tail end of the first slice of the split bit plane and during a front end of the second slice of the split bit plane and wherein the overall duration of the split bit plane is increased to maintain an overall bit weighting for the split bit plane.

21. The image processing unit of claim 13, wherein the spatial light modulator is capable of globally changing all of the bit planes simultaneously in each of the plurality of spatial segments, and wherein the control unit modulates the solid state light source at the modulated level in conjunction with setting one bit plane simultaneously across all spatial segments and continues to modulate the solid state light source at the modulated level until after at least one bit plane across all spatial segments.

22. The image processing unit of claim 21, wherein the spatial light modulator defines a plurality of pixels that each change as data is loaded to the spatial light modulator.

23. The image processing unit of claim 21, wherein a bit plane is split into at least two slices such that a first slice of the split bit plane is on one side of the at least one bit plane during which the solid state light source is modulated and such that a second slice of the split bit plane is on an opposite side of the at least one bit plane during which the solid state light source is modulated.

24. The image processor of claim 23, wherein the solid state light source is modulated during a tail end of the first slice of the split bit plane and during a front end of the second slice of the split bit plane and wherein the overall duration of the split bit plane is increased to maintain an overall bit weighting for the split bit plane.

25. An image display system comprising:
   an image processing unit configured to receive an incoming video signal;
   a sequential solid state light source coupled to the image processing unit; and
   a non-globally changing spatial light modulator coupled to the sequential solid state light source and to the image processing unit;
   means for defining image frames from the video signal, the image frames having bit planes in a plurality of spatial segments for manifestation on the spatial light modulator;
   means for defining on and off states for the sequential solid state light source;
   means for modulating the sequential solid state light source at a modulated level during at least one bit plane such that illumination of the sequential solid state light source at the modulated level is equally applied during the at least one bit plane for each of the plurality of spatial segments; and
   means for minimizing color errors at a transition from one light emitting diode color to another;
   wherein the sequential solid state light source includes a plurality of light emitting diodes of different colors and wherein the image processing unit defines on and off states for a particular color of light emitting diode.

26. The image display system of claim 25, wherein the transition between a first LED color and a second LED color is accomplished by illuminating the second LED color before turning off the first LED color.

27. The image display system of claim 25, wherein said transition between a first LED color and a second LED color is accomplished by illuminating the all LED colors; all LED colors except the second LED color being turned off after the transition.

28. The image display system of claim 25, wherein said transition between a first LED color and a second LED color is accomplished by turning off the first LED color and then illuminating the second LED color only after the array pixels have been moved to their new states.

29. A method of processing an image comprising:
   receiving an incoming video signal;
   defining image frames from the video signal such that the image frames have bit planes in a plurality of spatial segments for manifestation on a spatial light modulator;
   defining on and off states for a solid state light source; and
   modulating the solid state light source at a modulated level during at least one bit plane such that illumination of the solid state light source at the modulated level is equally applied during the at least one bit plane for each of the plurality of spatial segments.

30. The method of claim 29 further including decreasing the modulated level by decreasing the illumination intensity of the solid state light source.

* * * * *